March 8, 1966 — M. A. ALBRIGHT ETAL — 3,239,198
APPARATUS FOR BLENDING MATERIAL
Filed Sept. 4, 1962 — 2 Sheets-Sheet 1

INVENTORS
M.A. ALBRIGHT
R.R. GOINS
BY Young & Quigg
ATTORNEYS

INVENTORS
M.A. ALBRIGHT
R.R. GOINS

United States Patent Office 3,239,198
Patented Mar. 8, 1966

3,239,198
APPARATUS FOR BLENDING MATERIAL
Melvin A. Albright and Robert R. Goins, Bartlesville, Okla., assignors to Phillips Petroleum Company, a corporation of Delaware
Filed Sept. 4, 1962, Ser. No. 221,196
5 Claims. (Cl. 259—4)

This invention relates to the blending of solid particulate materials.

There are a number of industrial operations wherein it is necessary or desirable to mix solid particulate materials to obtain a uniform blend. For example, in the plastics industry, various types of polymers are commonly produced and sold as small pellets. Quite often it is desirable to blend different types of these pellets to obtain a uniform mixture having desired properties. In some manufacturing operations it is difficult to produce materials which have identical properties at all times. When this occurs, blending of the materials produced at different times will result in a uniform product.

The present invention is directed toward providing a simple, inexpensive procedure for obtaining a uniform blend of solid particulate materials. This is accomplished by positioning the particles to be blended in a storage vessel which is provided with a plurality of exit ports spaced from one another in the bottom of the vessel. Particles are then withdrawn from all of these exit ports, mixed and returned to the storage vessel. The particles are returned to the storage vessel through an entrance port in the top of the vessel which is located with respect to the several exit ports such that particles subsequently removed through the exit ports have different residence times in the storage vessel. The circulation of particles in this manner is continued until a uniform blend is obtained. In another aspect, particles removed through a plurality of exit ports are mixed and returned to a plurality of spaced entrance ports.

Accordingly, it is an object of this invention to provide a simple, rapid and inexpensive apparatus for mixing solid particulate materials to produce a uniform blend.

Another object is to provide novel apparatus for use in blending solid particulate materials.

Other objects, advantages and features of the invention should become apparent from the following detailed description, taken in conjunction with the accompanying drawing in which.

Figure 1:
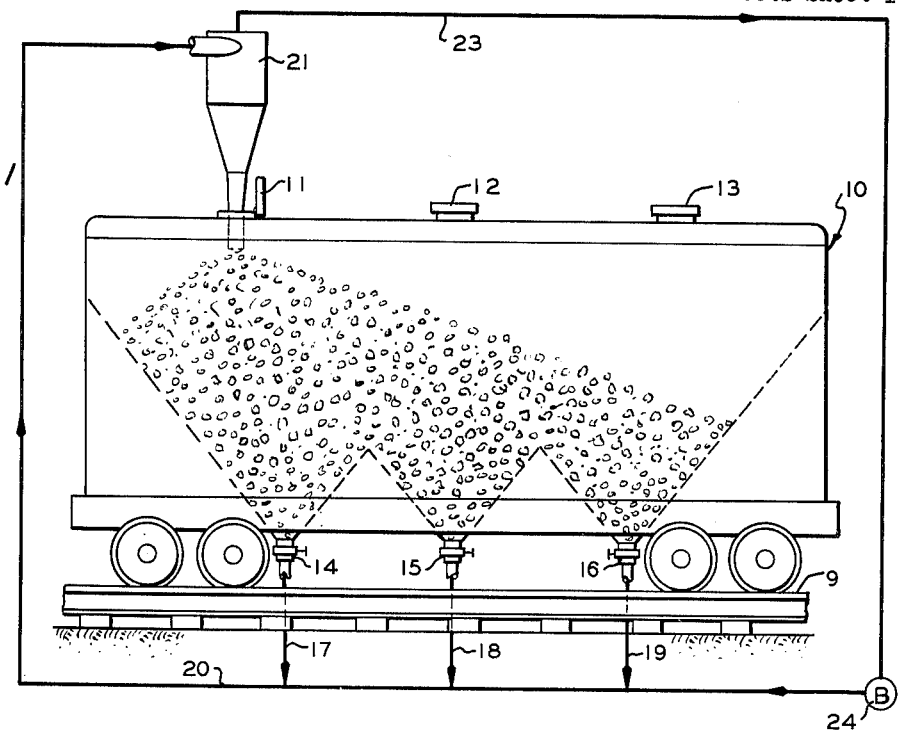
FIGURE 1 is a schematic representation of a first embodiment of this invention for mixing pellets in a railroad hopper car.

Referring now to the drawing in detail and to FIGURE 1 in particular, there is shown a railroad hopper car 10 which rests on a rail 9. Car 10 is provided with a plurality of filling ports 11, 12 and 13 through which material to be transported can be introduced. In the embodiment of this invention illustrated in FIGURE 1, it will be assumed that particles of different types have been introduced into car 10 so that a non-uniform mixture occupies the car after it is filled. This can occur, for example, if the materials produced at different times have different properties and if these materials are added to car 10 as they are produced. In other operations, particles having different properties may deliberately be introduced into the car in controlled amounts so that a final blend having desired properties can be obtained. In still other operations, the mixing procedure described hereinafter is carried out while tank 10 is being filled through one or more of the filling ports 11, 12 and 13.

Hopper car 10 is provided with a plurality of outlets which are closed by respective slide valves 14, 15 and 16. When it is desired to mix the particles in car 10, conduits 17, 18 and 19 are connected to the outlets of respective valves 14, 15 and 16. The second ends of conduits 17, 18 and 19 communicate with a conduit 20 which in turn communicates with the inlet of a solids-gas separator, such as a cyclone separator 21. The bottom of separator 21 is inserted through opening 11. The top of separator 21 is connected by a conduit 23 to the inlet of a blower 24. The outlet of blower 24 is connected to conduit 20. When valves 14, 15 and 16 are opened, particles in tank 10 are removed through respective conduits 17, 18 and 19 and enter common conduit 20. These particles are transported by blower 24 to cyclone separator 21 where the particles are separated from the transport gas. The particles are thus returned to tank 10 at a location which is spaced different distances from the three outlets of the tank car. If air is employed as the carrier gas and separator 21 removes all of the particles, return conduit 23 is not needed. For some operations, separator 21 is not needed. Conduit 20 can extend directly into port 11.

Due to the fact that the outlets are different distances from opening 11, the residence times of the particles that gravitate through tank 10 to the three outlets are different. This difference in residence times facilitates uniform mixing of the particles. In addition, the openings of valves 14, 15 and 16 can be varied to change the residence times of the particles removed through these different valves. The circulation of pellets in this manner is continued until a uniform blend is obtained within hopper car 10. This blending operation can occur prior to the time the pellets are shipped or after the pellets arrive at their destination. The conduits employed to transport the pellets can be flexible so that the apparatus can readily be attached to hopper cars of different sizes. It may be desirable to elevate track 9 or provide a pit beneath the track so that the circulating conduits can readily be attached.

The pneumatic conveyor system illustrated in FIGURE 1 is the presently preferred method of transporting the pellets from the outlet ports to the inlet because this type of conveyor system is relatively inexpensive to construct and can readily be attached to the hopper car. If the particles being mixed are of such nature that there is little entrainment in the air passing through conduit 23, this conduit can be omitted entirely with blower 24 receiving atmospheric air. Although a pneumatic conveying system has been illustrated, other types of conveyors can be employed in accordance with this invention. For example, screw conveyors or conveyor belts can be utilized to transport the pellets from the outlet openings to the inlet.

Figure 2:
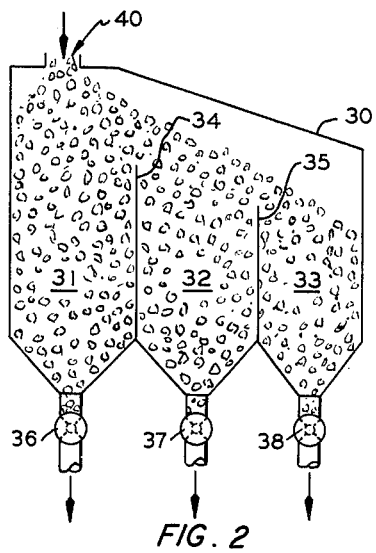
FIGURE 2 is a schematic representation of a second type of mixing vessel which can be employed.

A second configuration of the mixing vessel, which can also be a hopper car, is illustrated schematically in FIGURE 2. Vessel 30 is divided into three chambers 31, 32 and 33 by baffle plates 34 and 35. Control valves 36, 37 and 38 are disposed in the bottoms of these three chambers to regulate the flow of particles therefrom. The particles removed from the chambers are subsequently returned to the inlet 40 of vessel 30 by a conveyor, such as shown in FIGURE 1. The particles to be mixed are introduced into vessel 30 through opening 40. It should be evident that these particles initially fill chamber 31, then overflow into chamber 32, and finally overflow into chamber 33. An arrangement of this type can be employed to advantage to meter different amounts of particles having different properties into the mixing vessel. During the mixing cycle, pellets are removed from all three chambers and returned to inlet 40 where they are again distributed into the three chambers.

Figure 3:
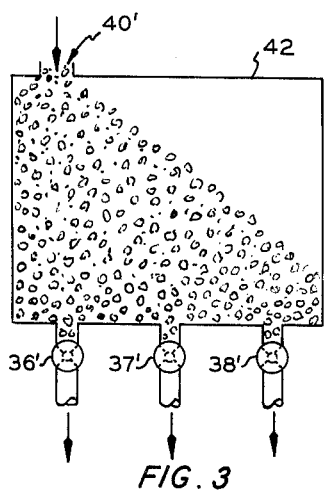
FIGURE 3 is a schematic representation of a third type of mixing vessel which can be employed.

The storage vessel can be almost any desired shape. In FIGURE 3, for example, there is shown a conventional storage tank 42 which can be cylindrical or rectangular in cross-section. This tank is provided with an inlet and with outlets which correspond to those shown in FIGURE 2 and which are designated by like primed reference numerals. The storage vessel of FIGURE 3 can be constructed at a minimum of cost merely by adding a plurality of outlets to a conventional storage tank. In order to prevent dead spaces along the bottom of tank 42 between the outlet valves, the bottom of the tank can be sloped.

Figure 4:
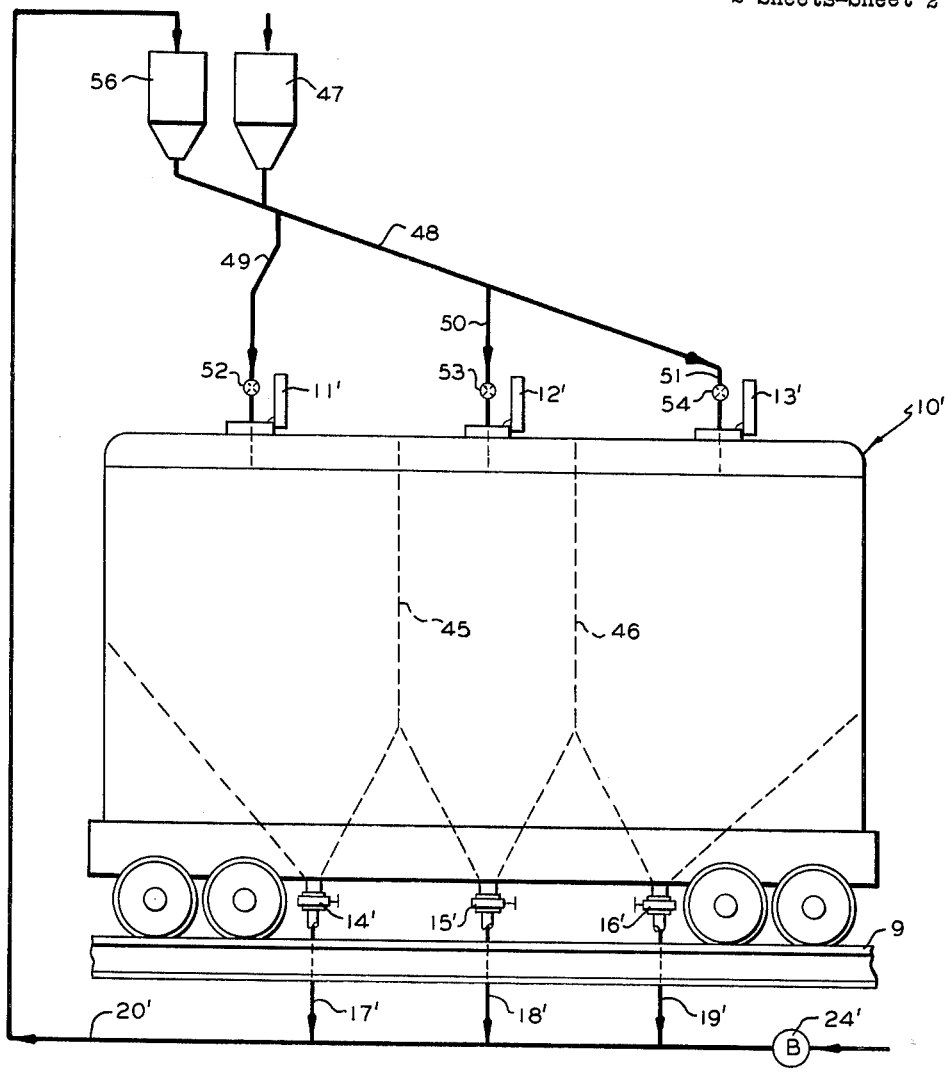
FIGURE 4 is a schematic representation of another system for mixing pellets in a hopper car.

Another embodiment of this invention is illustrated schematically in FIGURE 4. Hopper car 10' and the associated conduit system are generally the same as illustrated in FIGURE 1. However, it should be noted that car 10' is divided into three compartments by partitions 45 and 46. The material to be transported in car 10' is introduced into a hopper 47 which communicates with a distributor conduit 48. Conduits 49, 50 and 51 communicate between conduit 48 and respective inlet ports 11', 12' and 13'. Control valves 52, 53 and 54 are disposed in respective conduits 49, 50 and 51. Return conduit 20' communicates with a hopper 56, which empties into conduit 48.

In the operation of the mixing system illustrated in FIGURE 4, particles can be recirculated through conduit 20' either during the time the hopper car is being filled or after the car has been filled. It should be evident that the material withdrawn from the three separate compartments is mixed in the conduit system and returned to one of the three compartments. The relative flows to the individual compartments can be adjusted by manipulation of the valves in the filling conduits to regulate the rates at which the material is returned to the individual compartments. In this manner, desired degree of mixing can readily be achieved.

It should be evident that the mixing procedure of this invention can be employed with a wide variety of materials. Examples of materials which can be mixed by this procedure include plastic pellets, granular fertilizer, carbon black, grain and catalyst particles. If it is desirable to mix materials in the absence of air, a closed mixing vessel can be employed which is filled with an inert gas. Some types of materials may have a tendency to adhere to the walls of the mixing vessel. In this case, mechanical agitators or vibrators can be employed to keep the particles moving freely within the mixing vessel. Similarly, streams of air or other gases can be directed along the inner walls of the mixing vessel to prevent particles from adhering to the walls.

While the invention has been described in conjunction with presently preferred embodiments, it should be evident that it is not limited thereto.

What is claimed is:
1. Mixing apparatus comprising a container having an entrance port in the upper region thereof and plurality of particulate material exit ports in the lower region thereof, means for adjusting individually the rate of flow of particulate material through each of said exit ports, said exit ports being spaced different distances from said entrance port, said plurality of exit ports positioned in the same horizontal plane, and conveyor means communicating between said exit ports and said entrance port to transport materal withdrawn from said container through said exit ports to said entrance port.

2. Mixing apparatus comprising a container having an entrance port in the upper region thereof and a plurality of particulate material exit ports in the lower region thereof, means for adjusting individually the rate of flow of particulate material through each of said exit ports, said exit ports being spaced different distances from said entrance port, and conveyor means communicating between said exit ports and said entrance port to transport material withdrawn from said container through said exit ports to said entrance port, said conveyor means comprising a cyclone separator, conduit means communicating between said exit ports and the inlet of said separator, a blower communicating with said conduit means to transport material therethrough, and means connecting the lower exit port of said separator with said entrance port.

3. Mixing apparatus comprising a vessel having an inlet port in the top thereof adjacent a side wall of the vessel and a plurality of particulate material exit ports in the bottom, said exit ports being located different distances from a point directly under said inlet port, said plurality of exit ports positioned in the same horizontal plane, a valve in each of said exit ports, and conveyor means communicating between said exit ports and said entrance port to transport material withdrawn from said vessel through said exit ports to said entrance port.

4. Mixing apparatus comprising a vessel having an inlet port in the top thereof adjacent a side wall of the vessel and a plurality of exit ports in the bottom, said exit ports being located different distances from a point directly under said inlet port, said plurality of exit ports positioned in the same horizontal plane, baffle means extending from the bottom of said vessel upwardly toward but spaced from the top of said vessel to divide the lower region of said vessel into a plurality of chambers, each of which has an exit port in the bottom thereof, a valve in each of said exit ports, and conveyor means communicating between said exit ports and said entrance port to transport material withdrawn from said vessel through said exit ports to said entrance port.

5. Mixing apparatus comprising a hopper car having a plurality of exit ports in the bottom thereof in spaced relationship with one another and at least one entrance port in the top thereof which is spaced unequal distances from said exit ports, said plurality of exit ports positioned in the same horizontal plane, and conveyor means communicating between said exit ports and said entrance port to transport material withdrawn from said vessel through said exit ports to said entrance port.

References Cited by the Examiner

UNITED STATES PATENTS

| | | | |
|---|---|---|---|
| 384,656 | 6/1888 | Weber | 259—18 X |
| 2,572,758 | 10/1951 | Quigg | 34—167 X |
| 2,586,818 | 2/1952 | Harms | 259—4 X |

FOREIGN PATENTS

| | | |
|---|---|---|
| 533,673 | 12/1954 | Belgium. |
| 1,034,464 | 7/1958 | Germany. |
| 847,731 | 9/1960 | Great Britain. |
| 90,704 | 12/1957 | Norway. |

IRVING BUNEVICH, *Primary Examiner.*

WALTER A. SCHEEL, *Examiner.*